S. M. DICK.
GEARLESS DIFFERENTIAL MECHANISM.
APPLICATION FILED APR. 12, 1915.
1,232,244.
Patented July 3, 1917.
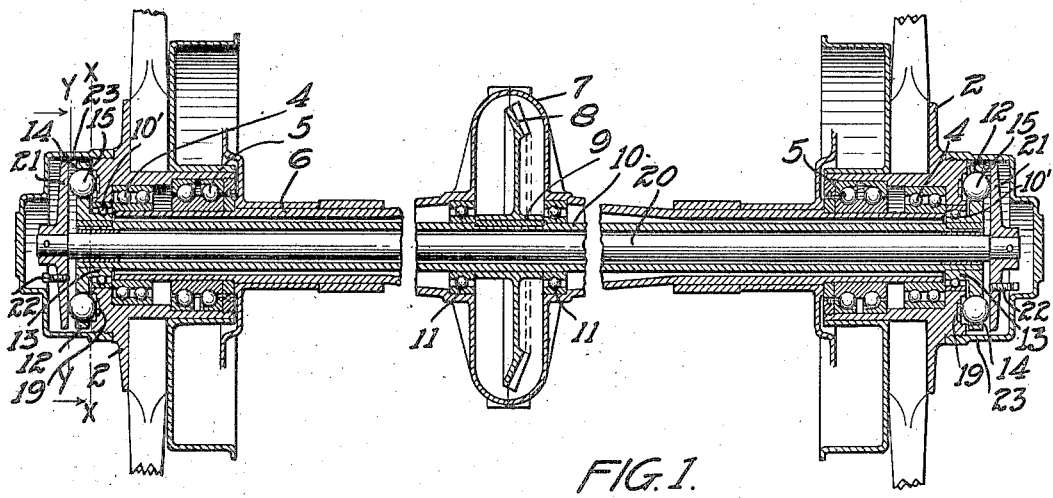
FIG. 1.
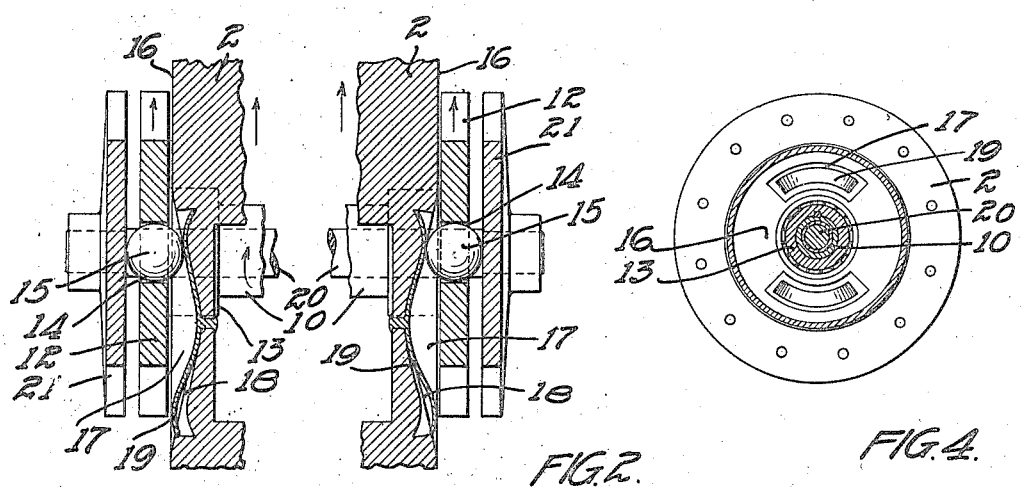
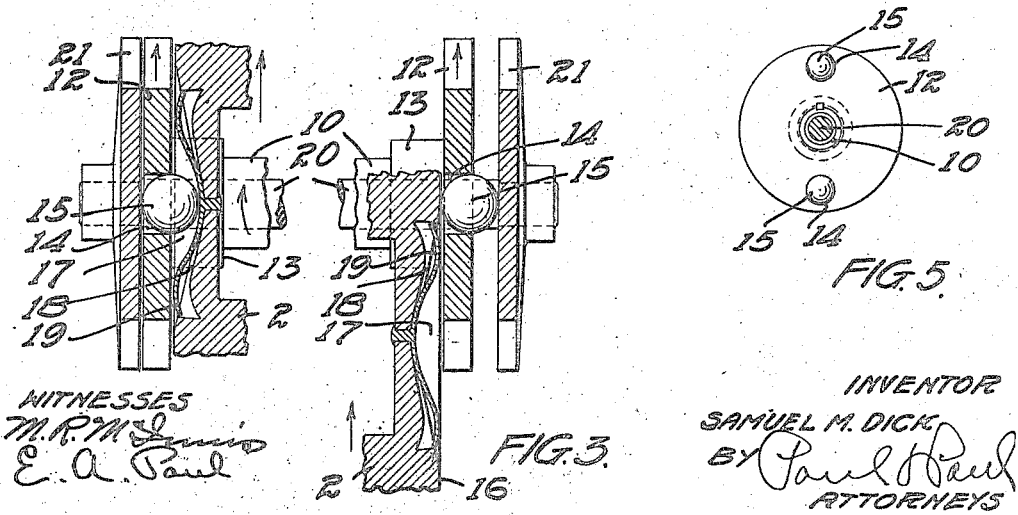
WITNESSES
M. R. M. Lewis
E. A. Paul
INVENTOR
SAMUEL M. DICK.
BY Paul & Paul
ATTORNEYS

UNITED STATES PATENT OFFICE.

SAMUEL M. DICK, OF MINNEAPOLIS, MINNESOTA, ASSIGNOR OF ONE-HALF TO ANDREW H. MAAS, OF MINNEAPOLIS, MINNESOTA.

GEARLESS DIFFERENTIAL MECHANISM.

1,232,244.   Specification of Letters Patent.   Patented July 3, 1917.

Application filed April 12, 1915. Serial No. 20,916.

*To all whom it may concern:*

Be it known that I, SAMUEL M. DICK, citizen of the United States, resident of Minneapolis, county of Hennepin, State of Minnesota, have invented certain new and useful Improvements in Gearless Differential Mechanism, of which the following is a specification.

The object of my invention is to provide a driving mechanism by means of which the rear wheels of a motor driven car or other vehicle may be operated at different speeds and either forward or backward.

A further object is to provide a driving mechanism by means of which the motive power is equally distributed to the rear wheels when the car is running forward in a straight line and automatically shifted to the wheel of slower motion when the car is making a curve. The motive power is applied equally to both wheels and will therefore be most effective through the wheel working on the most solid surface when the car is driven through snow, mud or sand.

A further object is to provide a locking means for the mechanism to allow the application of power to either wheel, or both wheels, at the will of the operator, the accidental shifting of the power being impossible.

The invention consists generally in various constructions and combinations, all as hereinafter described and particularly pointed out in the claims.

In the accompanying drawings forming part of this specification,

Figure 1 is a longitudinal sectional view of a rear axle and rear wheel hubs, showing my improved gearless differential mechanism applied thereto, Fig. 2 is a detail sectional view, illustrating the normal position of the clutch parts for straight forward movement, Fig. 3 is a similar view, showing the position assumed by the clutch balls when the wheels are rounding a curve, Fig. 4 is a sectional view on the line *x—x* of Fig. 1, Fig. 5 is a sectional view on the line *y—y* of Fig. 1.

In the drawing, 2 represents the rear wheel hubs, having bearings 4 and 5 on a suitable housing 6. The middle portion of this housing has a casting 7 inclosing the gear wheel 8 that is driven from a suitable source of power, (not shown) and has a hub 9 secured on a sleeve 10. Suitable bearings 11 are provided between the sleeve and the casting 7 on each side of the gear wheel 8. The ends of the sleeve 10 project through the hubs 2, concentric with the wheels, and disks 12 have hubs 13 rigidly secured on said sleeve and provided with ball bearings 10'. These disks are provided with openings 14 therein to receive clutch members, such as balls 15, loosely fitting therein and of sufficient diameter to project outwardly on each side beyond the surfaces of the disk. The hub 3 has a flat surface 16 opposing the disk 12 and parallel therewith, and said surface has recesses 17 therein provided with cam surfaces 18 on which the clutch balls 15 are adapted to roll, said recesses varying in depth to allow the clutch balls to move in and out through the holes in their supporting disks 12.

I prefer to provide spring plates 19 in the bottom of the recesses to engage the clutch balls and yieldingly retard the same and prevent the noise of the balls contacting with the bottom of the recesses. In some instances these springs may be omitted, but I have illustrated them in this application with their end portions out of contact with the bottoms of the recesses until forced into engagement therewith by the pressure of the balls.

Referring now to Fig. 1, 20 is a rod, extending through the driving sleeve 10 from end to end and having bearings therein and projecting outwardly beyond said sleeve and having disks 21 secured to said projecting ends in position to bear on the outer faces of the balls in the disk 12 and limit their outward movement. This rod is adapted to move lengthwise in its bearings, following the inward and outward movement of the balls. If those on one side enter the recesses in the hub of the wheel, the rod 20 will slide toward the other side and allow the balls on that other side to move outwardly and pass out of the recesses in the hub at that end of the shaft. If the wheels are running forward in a straight line, the bearing balls will force the springs against the cam surfaces and assume the position shown in Fig. 2, the balls being clamped between the disks 21 and the cam surfaces of the recesses in the hubs, thereby temporarily locking the hubs and the driving sleeve together to turn the wheels. In rounding a curve, the outer wheel will, of course, move faster than the inner one and the hub of the outer wheel will gain on the bearing balls in engagement therewith to such an extent that the balls will roll back to the low part of the cam surfaces, as indicated in Fig. 3. When the clutch ball at one side of the machine seeks the deeper part of the recess in the hub of the wheel on that side, the disk 21, contacting with these balls, will be allowed to move inwardly and permit the balls bearing on the hub on the other side of the machine to roll out of their recesses, as indicated in Fig. 3, and temporarily release the wheel on that side. The drive of the sleeve 10 will continue and the clutch balls of the outer wheel will be carried up on the cam surface again to drive the outer wheel, and continue in this position until said outer wheel again gains or overtakes the balls and causes them to roll back to the low part of the cam surface in the bottom of the recesses. This release and pick-up of the outer wheel will continue as long as the machine is rounding a turn and there is a variation in the travel of the wheels. As soon, however, as the wheels begin to run forward in a straight line, the clutch balls will automatically return to their locking position, as indicated in Fig. 2, both balls bearing on the high parts of the cam surfaces and driving the wheels forward at the same speed.

For the purpose of locking the mechanism, I provide set screws 22 in the disks 21 in position to engage the disk 12 on either side of the machine. If the set screw on the left hand side of the figure is moved into contact with the disk 12 on that side, the rod 20 will evidently be moved lengthwise, releasing the left hand disk 21 from its clamping position and allowing the balls to run idle while the corresponding disk on the other side of the machine will be drawn inwardly to clamp the balls and the wheel hub together. Thus setting up the screw on one side or at one end of the axle operates to clamp or lock the wheel on the other side. The clutch balls and the friction disks are concealed and protected from dust and dirt by a suitable means, such as the caps 23 mounted on the projecting ends of the wheel hubs.

I do not wish to be confined to the number of clutch balls employed in this application, or to the precise manner of mounting them with respect to the wheel hubs, as in various ways these details of construction can be modified and still be within the scope of my invention.

I claim as my invention:

1. A gearless differential comprising a driving member, friction clutch means carried thereby, loosely mounted carrying wheels having friction surfaces to be engaged by said friction clutch means, clamping members for engaging said clutch means with said friction surfaces, said clamping members having means for connection with one another for allowing one member to move inwardly to its clamping position and the opposite member to move outwardly to its releasing position.

2. A gearless differential comprising a driving member, friction clutch balls carried thereby, loosely mounted carrying wheels having hubs provided with cam friction surfaces to be engaged by said balls and laterally moving clamping means for engaging said balls and forcing them against said cam surfaces to lock said wheels.

3. A gearless differential comprising a driving member, friction clutch balls carried thereby, loosely mounted carrying wheels having hubs provided with recesses therein, and cam surfaces formed in the bottom of said recesses, a laterally moving clamping means engaging said balls for holding them in said recesses to drive said wheels, the recesses of the outer wheel in rounding a curve allowing that wheel to gain in speed on the clutch balls and compensate for the difference in travel between the outer wheel and the inner wheel.

4. A gearless differential comprising a housing, carrying wheels loosely mounted thereon and having hubs provided with friction cam surfaces, a driving sleeve concentric with said housing and having friction balls to engage said cam surfaces and a clamping means for locking said balls in engagement with said surfaces, said clamping means having a lateral movement and releasing the wheel on one side when the clutch balls on that side are opposite the low points on the cam surfaces for that side.

5. A gearless differential comprising a housing, loosely mounted carrying wheels having hubs provided with cam friction surfaces, a driving sleeve concentric with said housing and hubs, disks mounted on said driving sleeve, friction balls mounted in said disks in position to engage the cam surfaces of said hubs, and means for clamping said balls against said friction surfaces to lock said wheels and disks together.

6. A gearless differential comprising loosely mounted carrying wheels having hubs provided with cam surfaces, a driving sleeve, disks mounted thereon, friction balls carried by said disks to engage said cam surfaces, a rod concentric with said sleeve and having an endwise movement therein, disks mounted on said rod and contacting with said friction balls, said clamping disks holding said balls against said friction surfaces for straight ahead movement of both of said wheels, the movement of the low points of the cam surfaces of one wheel to a position opposite the friction ball of that wheel allowing endwise movement of said rod to release the clamping disk of the other wheel.

7. A gearless differential comprising a suitable housing, carrying wheels loosely mounted thereon, and having hubs provided with cam surfaces, a driving member concentric with said hubs, friction clamping means carried by said driving member to engage said cam surfaces and drive said wheels, a rod concentric with said driving member, disks mounted on said rod and having bearing surfaces to contact with said friction means and clamp them against said cam surfaces, said rod having a longitudinal movement to allow inward and outward movement of said disks to clamp or release said means.

8. A gearless differential comprising a housing, carrying wheels loosely mounted thereon having friction cam surfaces, a driving member concentric with the hubs of said wheels, disks secured to said driving member, bearing balls mounted in said disks to contact with said friction surfaces, a rod concentric with said driving member, clamping plates mounted on said rod and arranged to bear on said balls and hold them in engagement with said friction surfaces, and means for temporarily locking either of said clamping plates on its adjacent disk.

9. A gearless differential comprising a housing, loosely mounted carrying wheels having hubs provided with recesses and cam surfaces formed in said recesses, springs mounted in said recesses to bear on said cam surfaces, a driving member having disks mounted thereon, clamping balls mounted in said disks to enter said recesses and contact with said springs, and means for temporarily locking said balls against said cam surfaces to drive said wheels.

10. A gearless differential comprising a driving member, friction clutch devices carried thereby, loosely mounted carrying wheels having hubs provided with radial recesses and cam surfaces formed in said recesses, clamping members engaging said clutch devices for forcing them into said recesses to drive said wheels, and means connecting said clamping members with one another and allowing one member to move inwardly to its clamping position and the opposite member to move outwardly to its releasing position.

In witness whereof, I have hereunto set my hand this 9th day of November, 1914.

SAMUEL M. DICK.

Witnesses:
EDWARD A. PAUL,
GENEVIEVE E. SORENSEN.